US012408808B2

(12) United States Patent
Metzel

(10) Patent No.: US 12,408,808 B2
(45) Date of Patent: Sep. 9, 2025

(54) SLIDE RELEASE MECHANISM FOR CLEANING DEVICE

(71) Applicant: CARL FREUDENBERG KG, Weinheim (DE)

(72) Inventor: Doug Metzel, Lombard, IL (US)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 18/168,590

(22) Filed: Feb. 14, 2023

(65) Prior Publication Data

US 2024/0268622 A1 Aug. 15, 2024

(51) Int. Cl.
*A47L 13/254* (2006.01)
*B25G 3/12* (2006.01)

(52) U.S. Cl.
CPC .............. *A47L 13/254* (2013.01); *B25G 3/12* (2013.01)

(58) Field of Classification Search
CPC ........ A47L 13/254; A47L 13/16; A47L 13/20; A46B 7/04; A46B 7/044
USPC .................................................. 15/147.1, 145
See application file for complete search history.

(56) References Cited

U.S. PATENT DOCUMENTS

| | | | | |
|---|---|---|---|---|
| 3,157,901 | A | 11/1964 | Hugh | |
| 6,202,246 | B1 * | 3/2001 | Boucher | A46B 9/06 15/115 |
| 10,052,006 | B1 * | 8/2018 | Morad | A47L 13/31 |
| 2016/0270618 | A1 * | 9/2016 | Lu | A47L 9/2805 |
| 2021/0169301 | A1 | 6/2021 | Hattin | |

FOREIGN PATENT DOCUMENTS

| | | | |
|---|---|---|---|
| EP | 3251575 | A1 | 12/2017 |
| WO | WO 2021249866 | A1 | 12/2021 |
| WO | WO 2022/022945 | A1 | 2/2022 |

* cited by examiner

*Primary Examiner* — Brian D Keller
*Assistant Examiner* — Jason Khalil Hawkins
(74) *Attorney, Agent, or Firm* — LEYDIG, VOIT & MAYER, LTD.

(57) ABSTRACT

A cleaning device, including a cleaning head receiver, a cleaning head frame, a cleaning material attached to the cleaning head frame, and a slide release having a handle, an ejecting surface, and a top surface. The ejecting surface is angled relative to the top surface, and the slide release is arranged within the cleaning head receiver. The slide release is configured to move in a first direction in response to a force applied by a user against the handle. The slide release is configured to apply an ejecting force against the cleaning head frame via the ejecting surface when the slide release is moved in the first direction.

18 Claims, 5 Drawing Sheets

SLIDE RELEASE MECHANISM FOR CLEANING DEVICE

FIELD

The present invention relates to a slider mechanism for releasing a cleaning element from a fixed position on a cleaning device.

BACKGROUND

Conventional cleaning devices include a cleaning element attached to a rod. The rod allows versatile control of the cleaning element to a user, as well as enabling a user to apply force to a cleaning surface with the cleaning element. A handle is typically included at or near an end of the rod opposing the cleaning element so that a user may more comfortably grip and manipulate the cleaning device. The cleaning element may be made of a variety of materials, but typically includes a textile with or without fringes, the textile being used to scrub and absorb dirt, dust, or other forms of debris on a cleaning surface. In some conventional cleaning devices, the cleaning element is permanently fixed to the rod. While such cleaning devices may be cheaper to manufacture, they are not suitable for versatile cleaning tasks, as only one type of cleaning element for a limited range of cleaning tasks may be attached to the rod throughout the life of the cleaning device. Such cleaning devices also require a particular procedure for cleaning the cleaning element when it becomes soiled, such as wringing the cleaning element in a wringing device of a mop bucket. Because the cleaning element cannot be separated from the cleaning device, the cleaning element and the remaining components of the cleaning device cannot be cleaned separately. Such cleaning devices are also inefficient in terms of sustainability, as it is typically easier to replace the cleaning device entirely than to replace a broken, defective, or irreversibly soiled cleaning element.

Some cleaning devices exist which include replaceable and/or interchangeable cleaning elements. However, the means for securing the cleaning element to a rod in such devices are limited in terms of rigidity, ease of use, the time required to switch out cleaning elements, and/or durability. Furthermore, the experience of replacing or changing cleaning elements is unpleasant because a user is required to touch a cleaning element to remove it from the rod. Therefore, what is needed is a cleaning device with a release mechanism facilitating quick attachment and detachment of a cleaning element from a cleaning device and addresses the foregoing deficiencies.

SUMMARY

A cleaning device, comprising a cleaning head receiver, a cleaning head frame, a cleaning material attached to the cleaning head frame, and a slide release having a handle, an ejecting surface, and a top surface. The ejecting surface is angled relative to the top surface, and the slide release is arranged within the cleaning head receiver. The slide release is configured to move in a first direction in response to a force applied by a user against the handle. The slide release is configured to apply an ejecting force against the cleaning head frame via the ejecting surface when the slide release is moved in the first direction.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
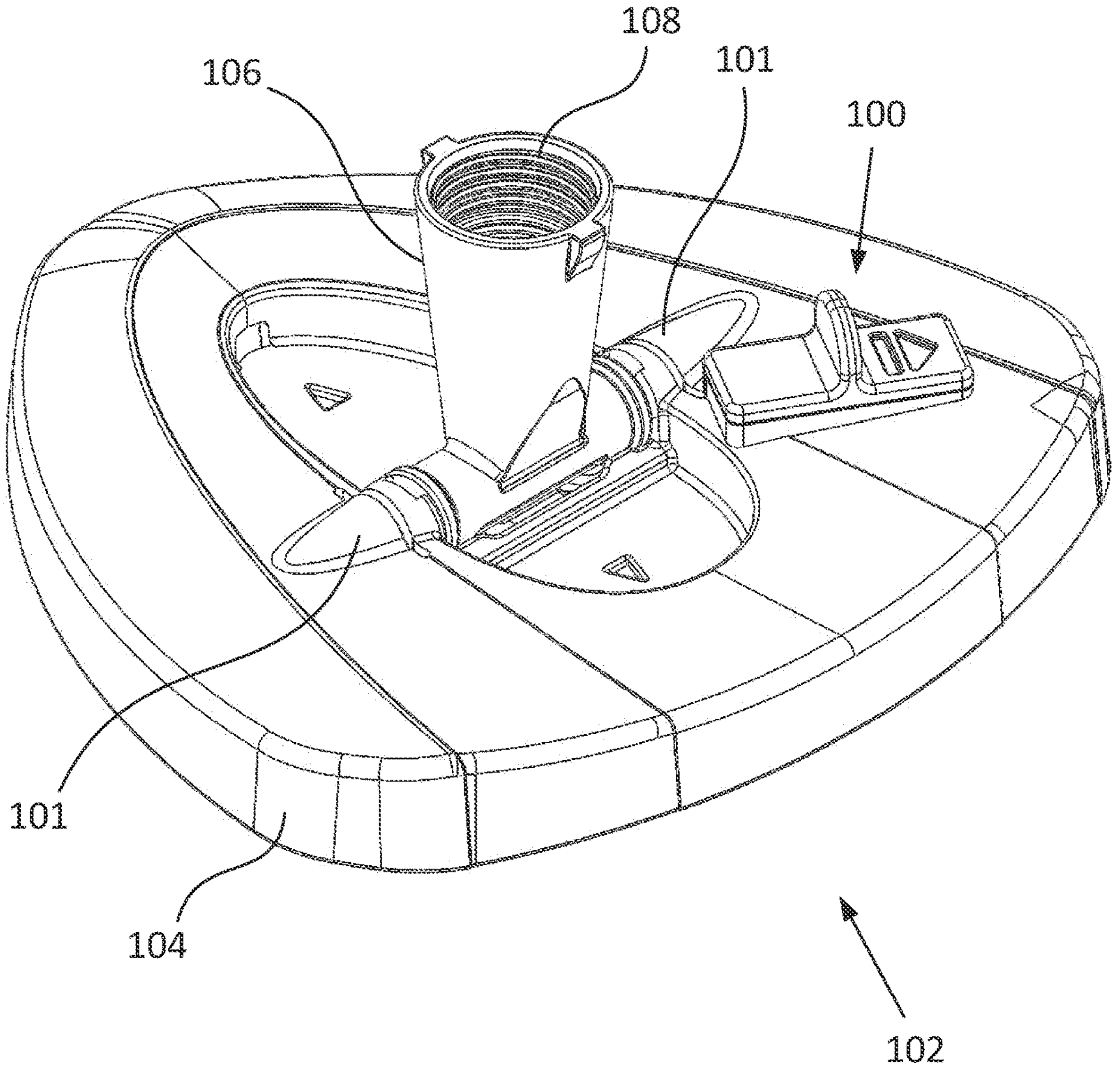
FIG. 1 illustrates a cleaning element receiver with a slide release mechanism according to an aspect of the disclosure.

Embodiments of the present disclosure relate to a cleaning device that includes an interchangeable cleaning head. The cleaning head may include a cleaning element that is attached to a cleaning element frame. The cleaning element can include cloth, fibers, or other materials used to absorb liquid, scrub a surface, and/or wipe and collect debris from a dirty or soiled surface. The cleaning element frame can include a solid structure onto which or through which parts of the cleaning element are attached, thereby forming a cartridge-like cleaning head that is interchangeable with other cleaning heads. A single cleaning device may thus include a cleaning element receiver configured to receive and secure a cleaning element frame while a cleaning operation is performed or while the cleaning device is stored. A single device may be used with several interchangeable cleaning heads of the same type or of varying types. Some particular features of the cleaning head itself are described in International Application Publication No. WO 2022/022945 A1, which is hereby incorporated by reference.

Embodiments of the present disclosure provide a slide release mechanism for releasing a cleaning head from a cleaning element receiver of a cleaning device. The slide release mechanism includes a sliding body that is configured to move translationally within a slot formed in a cleaning element receiver. When a force is applied to the sliding body, the force can be transmitted via the sliding body to a cleaning element frame held within the cleaning element receiver. The slide release mechanism thus enables a user of the cleaning device to easily apply a force to the slide release mechanism sufficient to free a cleaning element frame from within the cleaning element receiver. Because the slide release allows for quick application of force directed at a portion of the cleaning element frame, the slide release forces the cleaning element frame, and thus an associated cleaning element, out from within the cleaning element receiver in a manner that reduces deformation or wear that may occur as a result of inefficiently applied forces against the cleaning element and/or the cleaning element receiver. By providing an apparatus and a release procedure that are easier to use and follow; embodiments of the present disclosure enable cleaning devices to include a more versatile range of cleaning elements with varying functions and/or qualities. Furthermore, disclosed embodiments of the release mechanism enable a user to replace a cleaning element within a cleaning device without having to touch a cleaning element that has been soiled after a cleaning operation. Disclosed embodiments of the slide release mechanism can also be manufactured at low cost due to minimal parts used and simple integration within a cleaning element receiver. Disclosed embodiments also improve cleaning device operability due to a simplified release mechanism design that is intuitive to understand and to operate.

FIG. 1 illustrates a cleaning element receiver 102 with a slide release mechanism 100 according to an aspect of the disclosure. The slide release mechanism 100 is integrated in a receiver housing 104 of the cleaning element receiver 102. The cleaning element receiver 102 also includes a rod interface 106 for attaching the receiver housing 104 to a rod of a cleaning device. In the embodiment illustrated in FIG. 1, the rod interface 106 includes threads 108 for receiving a threaded rod of a cleaning device. It will be readily understood that other interfacing methods may be used to attach a rod of a cleaning device to a rod interface 106. In the illustrated embodiment, the cleaning element receiver 102 also includes hinge housings 101. The hinge housings 101 are configured to form a hinge together with complementary hinge components in the rod interface 106. For example, the hinge housings 101 may include slots or openings into which protrusions from the rod interface 106 are configured to extend (or vice versa), thereby forming a hinged connection via which the rod interface 106 may pivot. The rod interface is thus configured to pivot about an axis passing between the hinge housings 101 of the receiver housing 104.

As shown in FIG. 1, the receiver housing 104 may have a generally triangular shape with a recess in which the rod interface 106 is hingedly connected to the hinge housings 101. The rod interface 106 is thus arranged approximately at or near a centroid of the triangle formed by the receiver housing 104. In the illustrated embodiment, the slide release 100 is arranged between one corner of the triangle formed by the receiver housing 104 and the rod interface 106. This positioning of the slide release 100 ensures sufficient space for the slide release 100 is provided, as the slide release 100 must be of a sufficient length and width to be easily handled by a user. In addition, because the slide release 100 is provided in a slot within the receiver housing 104, the slide release 100 must be located within the receiver housing 104 at a location with sufficient space and structural rigidity to accommodate the void formed by a slot without compromising the structural integrity of the cleaning element receiver 102.

Furthermore, the positioning of the slide release 100 at a corner of the triangle formed by the receiver housing 104 ensures sufficient structural rigidity of the receiver housing 104 can be maintained to avoid forces applied via the slide release 100 from causing damage to the receiver housing 104. In some embodiments, the receiver housing may have a different shape, such as a circular, square, rectangular, oval, or other polygonal shape. The particular shape of the receiver housing may be based on the particular intended cleaning purpose of a cleaning device. For example, for smaller household applications, a smaller receiver housing may be used. For larger cleaning applications with larger cleaning elements, a larger rectangular receiver housing may be used to apply pressure through the cleaning device to the cleaning elements and a dirty surface more evenly over a larger area. In some embodiments, the slide release may not be arranged in a corner of a polygonal receiver housing. However, it is advantageous for the slide release to be positioned near a periphery of the receiver housing so that leverage applied by the slide release to a cleaning element frame within the receiver housing can be concentrated efficiently and the cleaning element frame can be ejected more easily. In some embodiments, more than one slide release may be included in a receiver housing where the size of a cleaning element is not conducive to being ejected from a receiver housing based only on a single point of leverage.

Figure 2A:
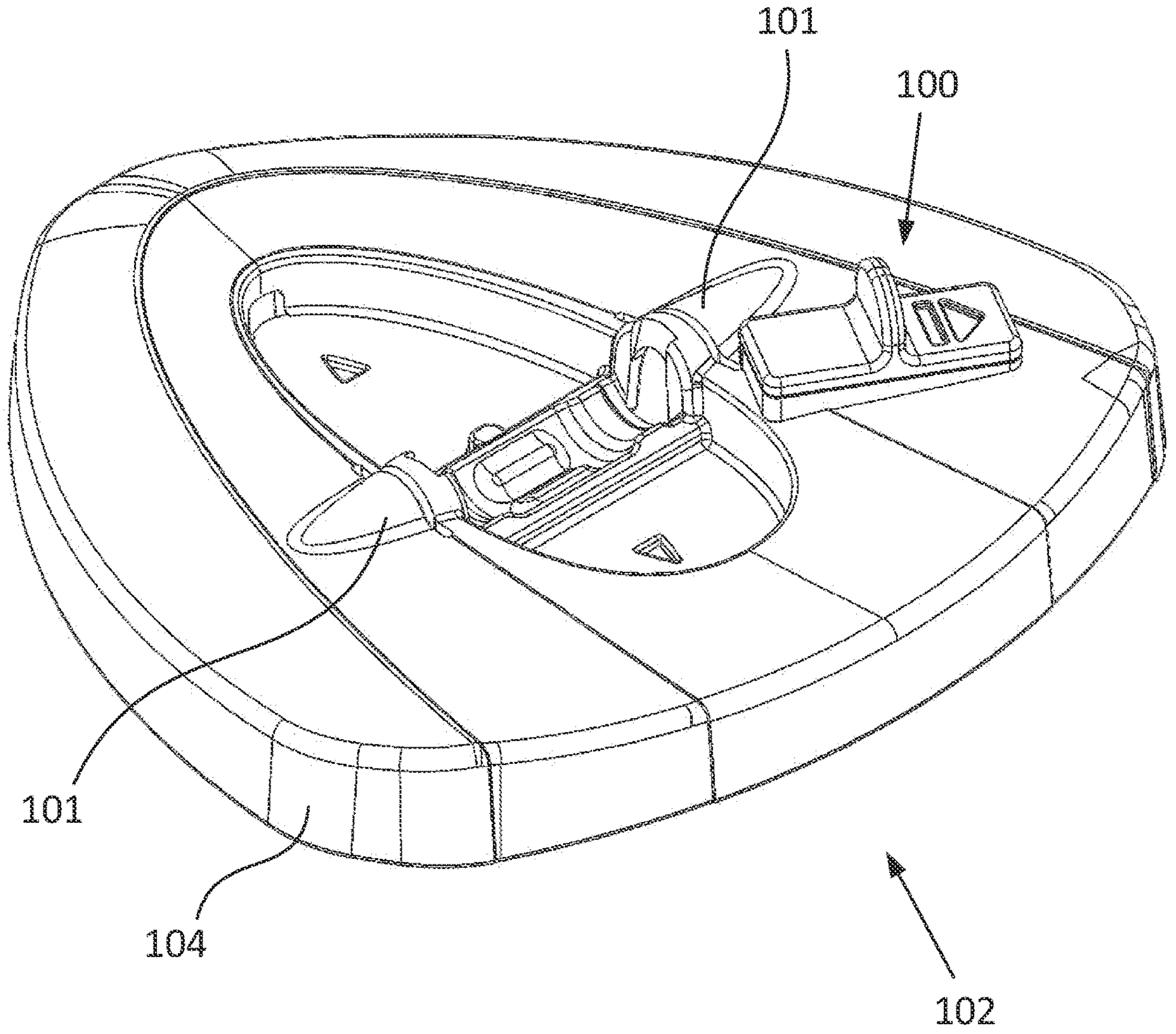
FIGS. 2A and 2B illustrate a cleaning element receiver with a slide release mechanism at a first position and a second position, respectively.
Figure 2B:
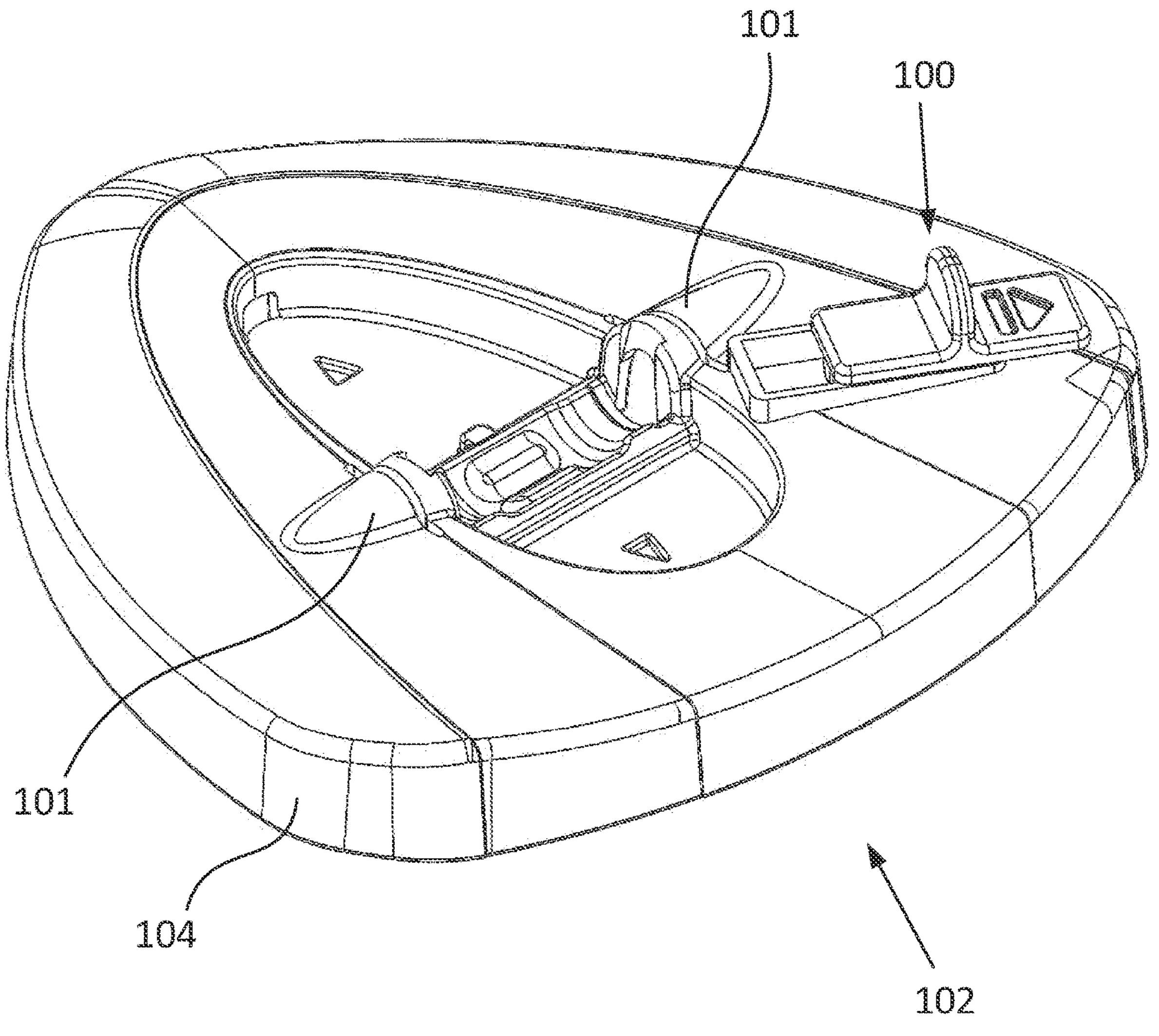

FIGS. 2A and 2B illustrate a cleaning element receiver 102 with a slide release 100 at a first position and a second position, respectively. As illustrated in FIG. 2A, a first position of the slide release 100 corresponds to a position in which a body of the slide release 100 is positioned closer to the rod interface 106. This position corresponds to a starting position in a release process, and is a position in which the body of the slide release has not yet started to eject a cleaning element frame from receiver housing 104. In other words, in the first position, a cleaning element remains secured within the cleaning element receiver 102 and the cleaning element may be used for cleaning a surface. When a release process is carried out, the slide release 100 is moved translationally from the first position to the second position, which is shown in FIG. 2B. The second position is an end position and represents a position in which the body of the slide release 100 has been moved sufficiently far enough to cause the cleaning element frame to be at least partially ejected from the receiver housing 104. As illustrated in FIG. 2B, the slide release 100 is moved farther from the center of the receiver housing 104 and closer to a periphery of the receiver housing 104. A user may thus slide the slide release 100 from the first position shown in FIG. 2A to the second position shown in FIG. 2B to facilitate ejection of a cleaning element frame from the receiver housing 104 of the cleaning element receiver 102. In some embodiments, the first position and second position are also configured to correspond to positions in which the body is at translational limits at a first and second end, respectively, of a slot in which the body may move. In some embodiments, it is advantageous if the first position also corresponds to a position in which the slider is abutting a first end of the slot and also abutting a cleaning element frame in the receiver housing 104. This is advantageous in that rattling of the body during movement of the cleaning device can thereby be prevented.

Figure 3:
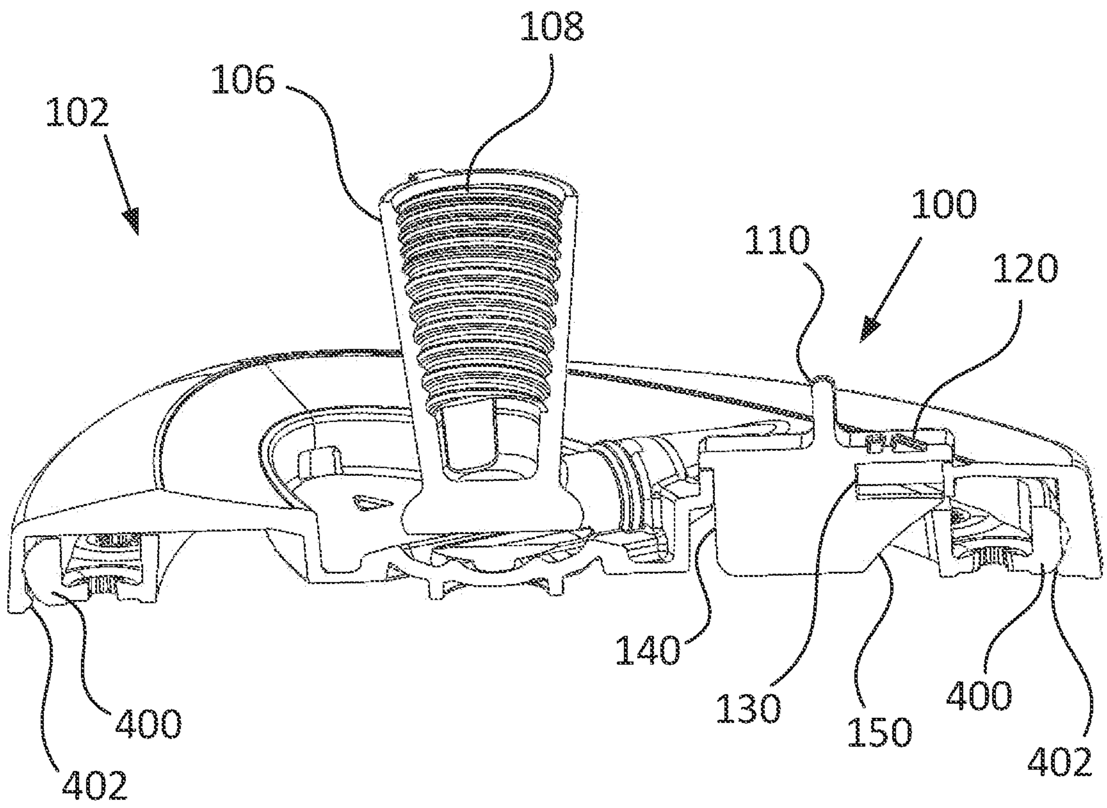
FIG. 3 illustrates a cross-sectional view of a cleaning element receiver with a slide release mechanism and a cleaning element frame according to an aspect of the disclosure.

FIG. 3 illustrates a cross-sectional view of a cleaning element receiver 102 with a slide release mechanism at a first position. The slide release 100 includes a handle 110, visual aids 120, a stopping surface 140, a slot 130, and an ejecting surface 150. The handle 110 of the slide release 100 is configured for interaction with a user, allowing the user to manually slide the slide release 100 by applying a force to the handle 110. The force applied to the handle 110 causes the slide release 100 to be translated between the first and second positions of the slide release 100 as shown in FIGS. 2A and 2B. If translation of the slide release 100 is inhibited by a cleaning element frame 400 secured within the receiver housing 104, the force applied by a user to the handle 110 is transmitted to the ejecting surface 150 and thus to the cleaning element frame 400. The ejecting surface 150 is at an angle with respect to the direction of translation of the slide release 100 and also extends between the receiver housing 104 of the cleaning element receiver 102 and the cleaning element frame 400. Translation of the slide release 100 in a direction from the first position to the second position thus causes the ejecting surface 150 to apply an ejecting force against the cleaning element frame 400 in a direction away from the receiver housing 104 (downward in FIG. 3). If a sufficient force is applied to the handle 110 by a user, the resultant ejecting force, which is proportionate to the force applied by the user, will cause the cleaning element frame 400 to be ejected at least partially from the receiving housing 104, and part of the ejecting surface 150 will occupy the space within the receiver housing 104 which was previously occupied by the cleaning element frame 400 before the ejection process was started.

It will also be readily appreciated that the handle 110 may have a variety of shapes and sizes and maintain its functionality as described above. For example, FIG. 3 illustrates a protruding handle 110 that forms a right angle relative to a top surface of the slide release body. In some embodiments, a different angle may be formed by the handle 110 relative to the top surface of the slide release body. If the handle 110 is angled toward the rod interface 106, for example, a user may be able to grip the handle more easily when their hands are wet, and the slide release may still be useable with less grip for a user when moving from the second position to the first position because less resistance is encountered by a user when sliding the slide release 100 in this direction. In some embodiments, the handle 110 may include ridges, indentations, patterns, or imperfections that increase a user's grip when manipulating the handle. Although FIG. 3 illustrates a handle 110 that has a generally uniform cross section along most of its length, the handle 110 may have a varying cross-sectional shape across its length to increase the amount of grip felt by a user. For example, the handle 110 may have a slightly concave portion on one or both sides of the handle 110 to partially accommodate a user's fingers or fingertips.

It will be readily appreciated that the ejecting surface 150 may have a variety of shapes to accomplish its function in the ejecting process. For example, although FIG. 3 illustrates an ejecting surface 150 that has a straight profile when viewed from the side in cross-section, it will be readily understood that the ejecting surface 150 may instead have a curved or irregular profile. An ejecting surface 150 having a curved profile with a gradually increasing angle relative to a top surface of the slide release body, for example, may facilitate beginning an ejection process with less force while gradually increasing the resistance felt by a user as the ejecting process is carried out to completion.

The visual aids 120 of the slide release are configured to convey information to a user. For example, the visual aids 120 may include an arrow indicating a direction of rotation of the slide release, text providing instructions to a user, and/or a symbol indicating the function of the slide release 100. In the illustrated embodiments (and as also shown in FIGS. 1-2B), the visual aids 120 include a universal "eject" symbol, thereby indicating to a user that use of the slide release 100 will result in ejection of a cleaning element held within the cleaning element receiver 102. In the illustrated embodiments, the visual aids 120 comprise indentations within the slide release 100, which may be formed by removal of material from the slide release 100 or by manufacturing the slide release 100 with a mold such that the slide release 100 includes visual aids 120 in its original form. It will be readily understood that visual aids 120 may likewise be formed via added materials or protrusions rather than indentations. In either case, the indentation or protrusion of the visual aids 120 from a surface of the slide release 100 allow the visual aids to be both visual and tactile aids, as a user may feel the indentations and/or protrusions and thereby recognize the component they are feeling, obtain a better grip on the slide release 100, and/or recognize the symbol or instructions of visual aid 120 by feel. In some embodiments, the visual aids 120 may also be added via printing, stamping, or painting, thereby reducing the cost of a mold for producing a more simple and smooth-faced slide release while still conveying necessary information to a user.

The slot 130 of the slide release 100 is formed between a top surface of the slide release 100 that is visible to a user and the ejecting surface 130. The slot 130 enables the slide release 100 to be moved between the first and second positions of the slide release 100 by providing a space that a portion of the receiver housing 104 may occupy as the slide release 100 is moved. In the first position, the portion of the receiver housing 104 occupying the slot 130 is at a far end of the slot 130 outward relative to the center of the receiver housing 104 and/or the rod interface 106. Movement of the slide release 100 is possible because the portion of the receiver housing 104 occupying the slot 130 occupies a space deeper within the slot 130 as the slide release 100 is moved toward the second position, and the depth of the slot 130 provides space that may be occupied by an increasing amount of the receiver housing 104. The slot 130 also acts as a guide to ensure that the slide release 100 moves in a direction that is intended, thereby increasing the intuitiveness of operation of the slide release 100 and of the ejecting process. An innermost surface of the slot 130 acts as an end-stop that delimits the maximum displacement the slide release 100 may carry out. For example, in the second position (as in FIG. 2B), the portion of the receiver housing 104 occupying the space within the slot 130 will also abut the innermost surface of the slot 130, thereby preventing further displacement of the slide release 100 in a direction from the first position to the second position.

The stopping surface 140 of the slide release 100 also delimits one end of the translational range of motion of the slide release 100. In the first position, the stopping surface 140 is configured to abut a portion of the receiver housing 104, thereby preventing further displacement of the slide release 100 in a direction from the second position to the first position.

As shown in FIG. 3 and also shown in FIGS. 1-2B, the slide release 100 includes a top surface and/or top portion that has larger footprint than an opening or slot formed in the receiver housing 104 to accommodate the rest of the slide release 100. This prevents the slide release 100 from falling through the opening in the receiving housing 104. The top surface and/or top portion of the slide release 100 also has a planar underside surface configured to abut against and rub against a periphery of the opening in the receiver housing 104 configured to accommodate the slide release 100. This ensures that the slide release 100 may slide against receiver housing 104 more easily by reducing friction between the two components. In some embodiments, the opening in the receiver housing 104 for accommodating the slide release 100 may have a flanged perimeter. The flanged perimeter interfaces with various surfaces of the slide release 100 (such as stopping surface 140, slot 130, and the underside of the top portion of the slide release 100). The flanged perimeter enables precise placement of the slide release in the receiver housing 104, acts as a type of guide rail guiding and delimiting movement of the slide release 100, and also enables integration of a single slide release design into various receiving housings of various shapes and/or sizes by providing a consistent interface for the slide release 100 that may be incorporated into different housings. As illustrated in FIG. 3, the flanged perimeter may also, on an end occupying space within the slot 130 of the slide release 100, have a height that is fitted to the height of the slot 130 within an appropriate tolerance for accommodating a firm fit while enabling sliding of the slide release 100.

FIG. 3 also illustrates that a cleaning element frame 400 is configured to fit at least partially within an internal cavity defined by the receiver housing 104. In the illustrated example, the cleaning element receiver 102 includes retaining protrusions 402 configured to abut the cleaning element frame 400 about at least portions of the perimeter of the receiver housing 104. The retaining protrusions 402 secure the cleaning element frame 400 to the receiver housing 104, and are configured to maintain secure attachment of the cleaning element frame 400) until a sufficient ejecting force is applied to the cleaning element frame 400. Thus, while the retaining protrusions 402 are configured to prevent ejection of a cleaning element frame 400 from the receiver housing 104, the retaining protrusions 402 are likewise configured to allow ejection of the cleaning element once an ejecting force is applied by the ejecting surface 150 of the slide release 100 to the cleaning element frame 400. The cleaning element frame 400 is configured to fit in a form-fitting manner within the receiver housing 104. Specifically, the receiver housing 104 includes an internal cavity configured to fit the cleaning element frame 400 and substantially match its height.

Figure 4:
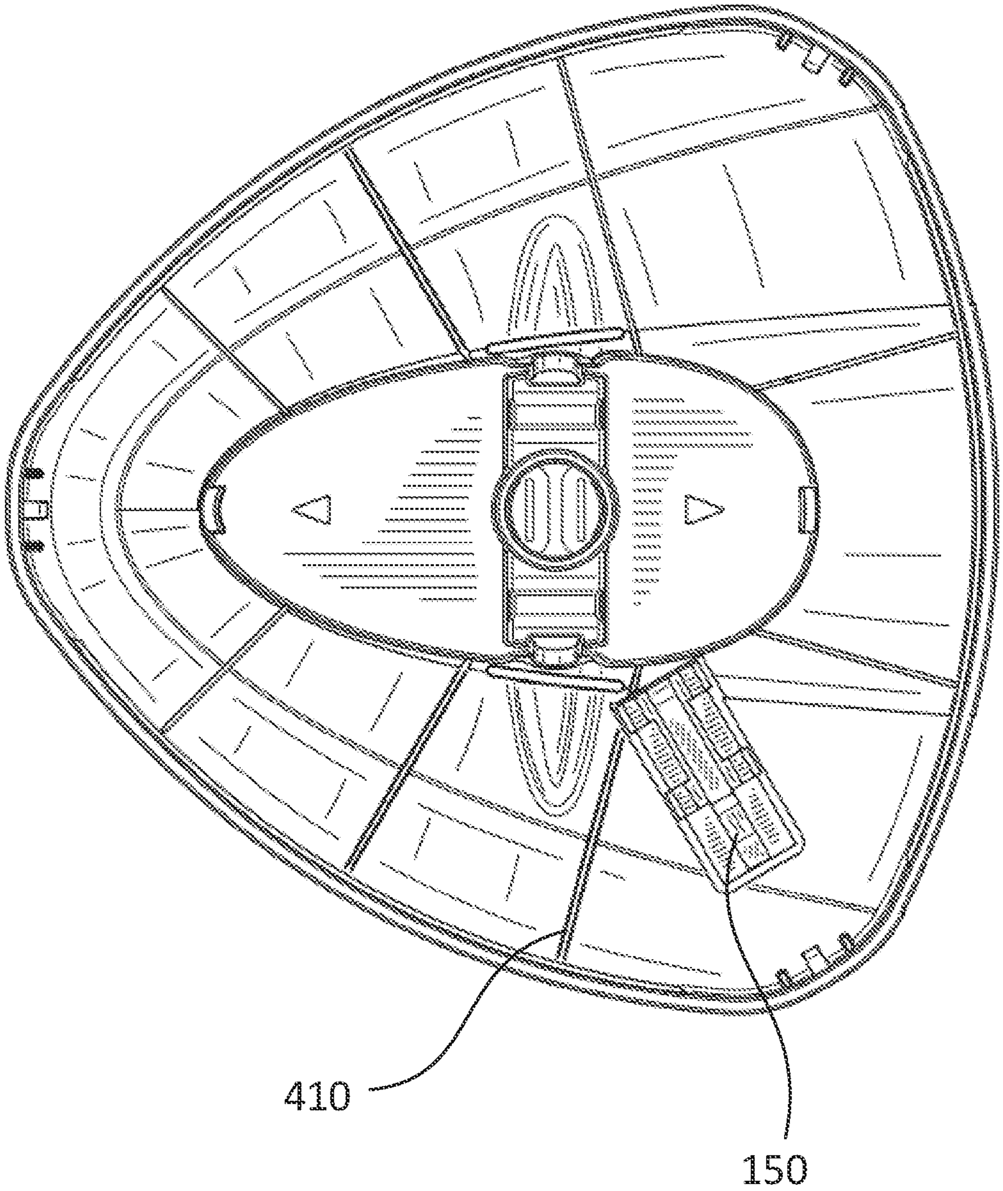
FIG. 4 illustrates a bottom view of a cleaning element receiver with a slide release mechanism according to an aspect of the disclosure.

FIG. 4 illustrates a bottom view of a cleaning element receiver with a slide release according to an aspect of the disclosure. More specifically, FIG. 4 illustrates a bottom view of the body and ejecting surface 150 of a slide release. In some embodiments, such as the embodiment illustrated in FIG. 4, the ejecting surface 150 may not extend the full width of the body of the slide release 100. Instead, only a width sufficient to maintain rigidity of the ejecting surface 150 and reliably carry out multiple ejecting processes over a planned lifetime of the slide release is required. Excess width can be avoided and a smaller overall body of the slide release can be employed to save on raw material costs. In some embodiments, the ejecting surface 150 may also have a width equal to that of the body of the slide release. As also illustrated in FIG. 4, the receiver housing 104 may include ribs 410 to provide structural rigidity to the receiver housing 104 and thereby to the cleaning element receiver 102 overall.

It will be readily appreciated that the present disclosure also discloses a method of operating a cleaning device corresponding to disclosed structures. In an embodiment, for example, a method of operating a cleaning device includes replacing a cleaning element by using a slide release. Specifically, after a first cleaning element becomes soiled or otherwise requires replacement, a user may user the slide release to eject the first cleaning element via its frame. A second cleaning element attached to a different frame can then be reinserted in the cleaning element receiver to replace the first cleaning element. Advantageously, a user may carry out this process without having to touch a soiled cleaning element that needs to be replaced, making replacement of a cleaning element and cleaning operations overall a more convenient process for a user. It will also be readily appreciated that various steps of the method for replacing an interchangeable cleaning element may also be carried out depending on specific structural features of the foregoing disclosure. For example, in embodiments of a slide release including a stopping surface configured to abut a surface of the cleaning element receiver, part of the method for interchanging a cleaning element may include inserting a new or replacement cleaning element frame into the cleaning element receiver until the slide release is translated to a position such that the stopping surface is caused to abut the respective surface of the cleaning element receiver.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A cleaning device, comprising:

a receiver housing;

a cleaning element frame;

a cleaning material attached to the cleaning element frame; and a slide release having a handle, an ejecting surface, and a top surface, the ejecting surface being angled relative to the top surface, and the slide release being arranged within the receiver housing, wherein the slide release is configured to move in a first direction from a center of the receiver housing toward a periphery of the receiver housing in response to a force applied by a user against the handle, and wherein the slide release is configured to apply an ejecting force against the cleaning element frame via the ejecting surface when the slide release is moved in the first direction, the ejecting force being directed downward and away from the receiver housing such that the ejecting force causes the cleaning element frame to move away from the receiver housing.

2. The cleaning device of claim 1, wherein the slide release comprises a slot, and wherein at least a portion of the receiver housing is configured to occupy a space within the slot.

3. The cleaning device of claim 1, wherein the slide release is configured to receive a force applied by a user to the handle and transmit a proportional force as the ejecting force against the cleaning element frame.

4. The cleaning device of claim 1, wherein the receiver housing has a triangular shape.

5. The cleaning device of claim 4, further comprising a rod fitting, the rod fitting being arranged at a centroid of the triangular receiver housing.

6. The cleaning device of claim 5, wherein the slide release is arranged between the rod fitting and a corner of the triangular receiver housing.

7. The cleaning device of claim 6, wherein the first direction extends from the rod fitting towards the corner of the triangular receiver housing.

8. The cleaning device of claim 1, wherein the receiver housing comprises a receiving cavity configured to receive the cleaning element frame, the receiving cavity being shaped to conform in a form-fitting manner to a shape of the cleaning element frame.

9. The cleaning device of claim 8, wherein the receiver housing comprises one or more protrusions configured to retain the cleaning element frame within the receiving cavity and resist expulsion of the cleaning element frame from the receiving cavity up to a threshold force.

10. The cleaning device of claim 8, wherein the ejecting surface is configured to at least partially occupy a gap between the cleaning element frame and the receiver housing regardless of the position of the slide release within the receiver housing.

11. The cleaning device of claim 8, wherein the ejecting surface is configured to abut the cleaning element frame while the cleaning element frame is fully retained in the receiver housing.

12. The cleaning device of claim 1, wherein the receiver housing includes an opening for receiving the slide release, and wherein the opening for receiving the slide release comprises at least one flange configured to fit in a slot of the slide release.

13. The cleaning device of claim 12, wherein the slide release includes a stopping surface configured to abut a portion of the opening of the receiver housing for receiving the slide release.

14. The cleaning device of claim 12, wherein the slide release includes an upper surface configured to cover the opening when the slide release is arranged in the opening.

15. The cleaning device of claim 1, wherein the cleaning material includes one or more surface cleaning materials configured to absorb liquid and collect debris on a cleaning surface.

16. A method of replacing a cleaning head of a cleaning device, comprising:

arranging a first cleaning element frame within a receiver housing;

ejecting the first cleaning element frame from the receiver housing by applying a force to a slide release arranged within the receiver housing such that the slide release moves in a first direction from a center of the receiver housing toward a periphery of the receiver housing; and thereby transmits an ejecting force to the first cleaning element frame, the ejecting force being proportional to the force applied to the slide release and being directed downward and away from the receiver housing such that the ejecting force causes the cleaning element frame to move away from the receiver housing;

providing a second cleaning element frame; and inserting the second cleaning element frame into the receiver housing.

17. The method of claim 16, wherein the first cleaning element frame is fully ejected from the receiver housing without the first cleaning element frame or a cleaning material attached to the first cleaning element frame being touched by a user.

18. A cleaning device, comprising:

a receiver housing;

a cleaning element frame;

a cleaning material attached to the cleaning element frame; and a slide release having a handle, an ejecting surface, and a top surface, the ejecting surface being angled relative to the top surface, and the slide release being arranged within the receiver housing, wherein the slide release is configured to move in a first direction from a center of the receiver housing toward a periphery of the receiver housing in response to a force applied by a user against the handle, wherein the slide release is configured to apply an ejecting force against the cleaning element frame via the ejecting surface when the slide release is moved in the first direction, the ejecting force being directed downward and away from the receiver housing such that the ejecting force causes the cleaning element frame to move away from the receiver housing, wherein the receiver housing comprises a receiving cavity configured to receive the cleaning element frame, the receiving cavity being shaped to conform in a form-fitting manner to a shape of the cleaning element frame, wherein the receiver housing comprises one or more protrusions configured to retain the cleaning element frame within the receiving cavity and resist expulsion of the cleaning element frame from the receiving cavity up to a threshold force, and wherein the cleaning element frame is configured to be ejected from the receiver housing upon the ejecting force being applied by the ejecting surface to the cleaning element frame exceeding the threshold force.

* * * * *